March 22, 1927.

F. A. HAYES

UNIVERSAL JOINT

Filed Sept. 27, 1926

INVENTOR
FRANK A. HAYES
BY
Verner F. Rothermund
ATTORNEY

March 22, 1927.  1,621,667
F. A. HAYES
UNIVERSAL JOINT
Filed Sept. 27, 1926  2 Sheets-Sheet 2

INVENTOR
FRANK A. HAYES
BY
ATTORNEY

Patented Mar. 22, 1927.

1,621,667

UNITED STATES PATENT OFFICE.

FRANK A. HAYES, OF KEYPORT, NEW JERSEY, ASSIGNOR TO HEALEY-AEROMARINE BUS COMPANY, INC., A CORPORATION OF NEW YORK.

UNIVERSAL JOINT.

Application filed September 27, 1926. Serial No. 137,981.

This invention relates in general to universal joints and more specifically to a control means for a type of joint adapted to maintain a constant velocity ratio between a driving and a driven member, in which type there is usually employed one or more intermediate members articulated to the driving and driven members respectively. The present embodiment discloses a compact form of joint particularly adapted to operate at extremely large angles under high power conditions such as are exemplified in the driving of a steerable vehicle wheel, and there is featured herein a new and novel control means in which the parts are journalled in the intermediate member; thus providing a compact and powerful joint structure of moderate over-all dimensions having special advantages to be hereinafter described.

It is well known that in the type of joints referred to, constant velocity ratio can only be maintained if the intermediate member is restrained at all times to a plane bisecting the angle between the driving and driven members. Various forms of controlling devices to attain this object are known in the art. Many of these devices are theoretically correct as to mode of operation, but are disproportionately weak as to their structure and bearings as compared with the joint structure with which they are associated.

When high angles between the shafts are encountered, a large proportion of the driving torque reacts upon the intermediate member tending to force it out of the desired plane of bisection between the shafts. This relatively powerful action must be resisted by the controlling member, which accordingly needs to have the same order of strength and rigidity as is necessary in the joint itself.

Some of the controlling members of the prior art as in the present invention comprise a hinged connection between a pair of arms which arms must be placed within the joint structure if undue increase in the over-all size of the joint is to be avoided. These hinged arms must also be adapted to move axially of their connection with the intermediate member, and where clearance for this movement is arranged for on either side of the hinge structures of some of the known types, an adequate length of hinge combined with suitable proportions of the two hinged elements cannot be disposed within an intermediate member of desirable proportions.

This invention accordingly features a simplified form of hinge controller in which there are only two major elements, the first connecting the intermediate n mber with the one of the driving members and the second or auxiliary element hinged to the first and connecting to the other drive or driven member. The simplicity and relative ruggedness of this construction will be at once apparent from the drawings.

From the action of the control members relative to the drive and driven members it will be evident to those skilled in the art that any form of hinged connection between these members which also provides a slight degree of sliding action may be used, but in the preferred form of the invention shown in the drawings a ball and socket type of connection is shown on one side and a slidable ball and socket on the other. Also the auxiliary control member (Fig. 4) which is hinged to the main control member is made the female member, the outside of the arm being of a rectangular section. This makes it possible to carry the sides of this arm back until they partially surround the hinge thus providing stiffening ribs which are of great importance in supplying the necessary strength at this section without undue increase in the space required for the action of the controller within the intermediate member.

One of the objects of the invention is to provide an improved form of controller for a universal joint, that is of such construction as to permit of the reduction of the number of parts to a minimum, and which is so proportioned and formed as to secure added strength and rigidity without increase in the size of the control member as a whole.

Various other objects and advantages of the invention will be in part obvious from an inspection of the accompanying drawings. The invention also consists in certain new and special features of construction and combination of parts hereinafter set forth and claimed.

Figure 1:
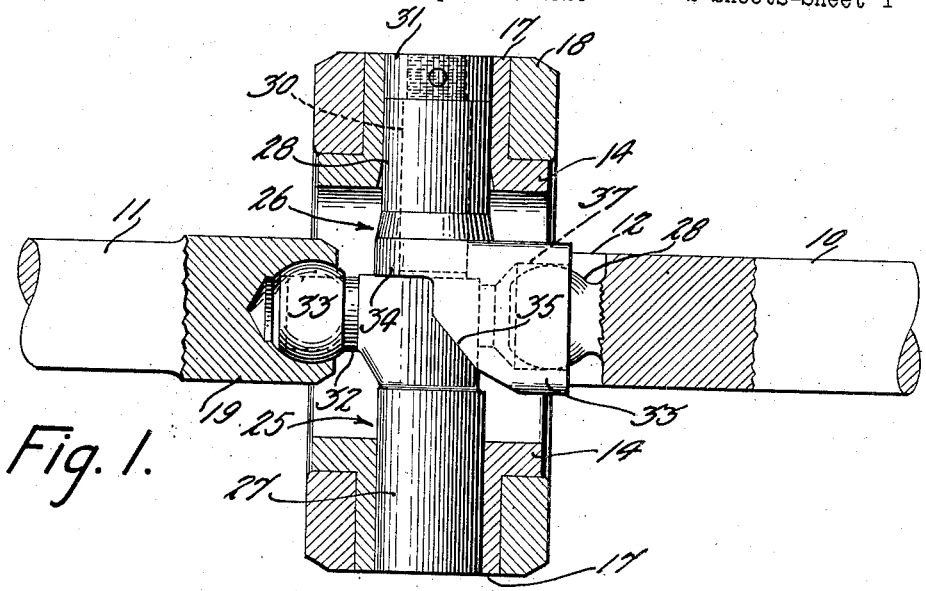
Figure 1 is a vertical section of a universal joint showing the improved form of a controller associated therewith.
Figure 2:
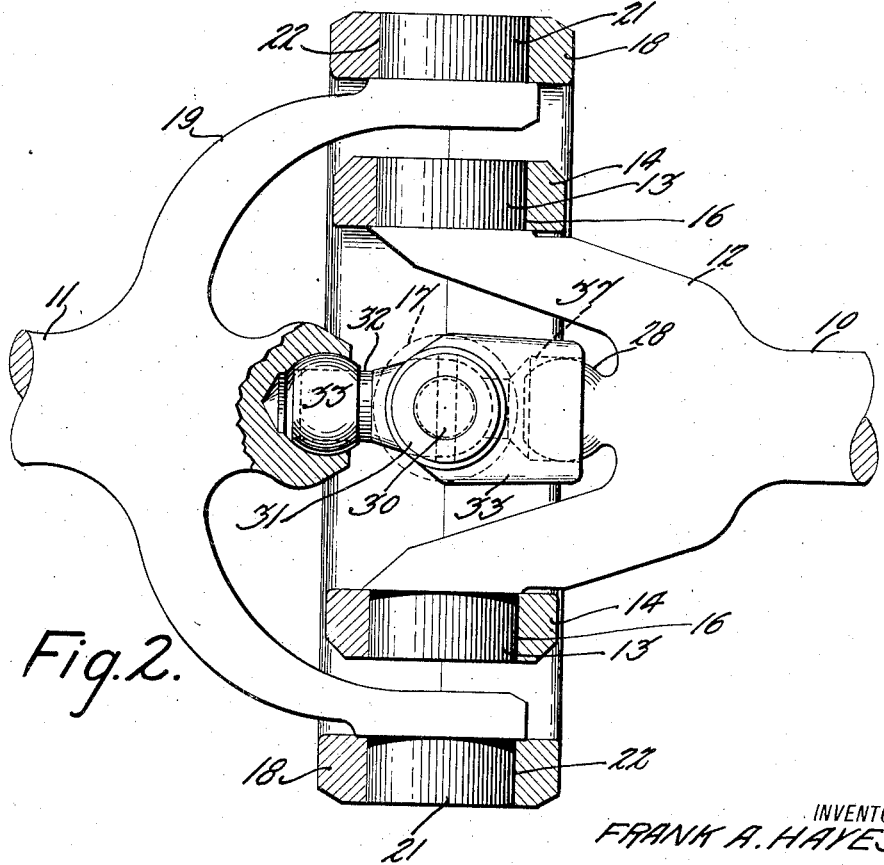
Figure 2 is a horizontal section of the parts shown in Fig. 1.
Figures 3, 4:
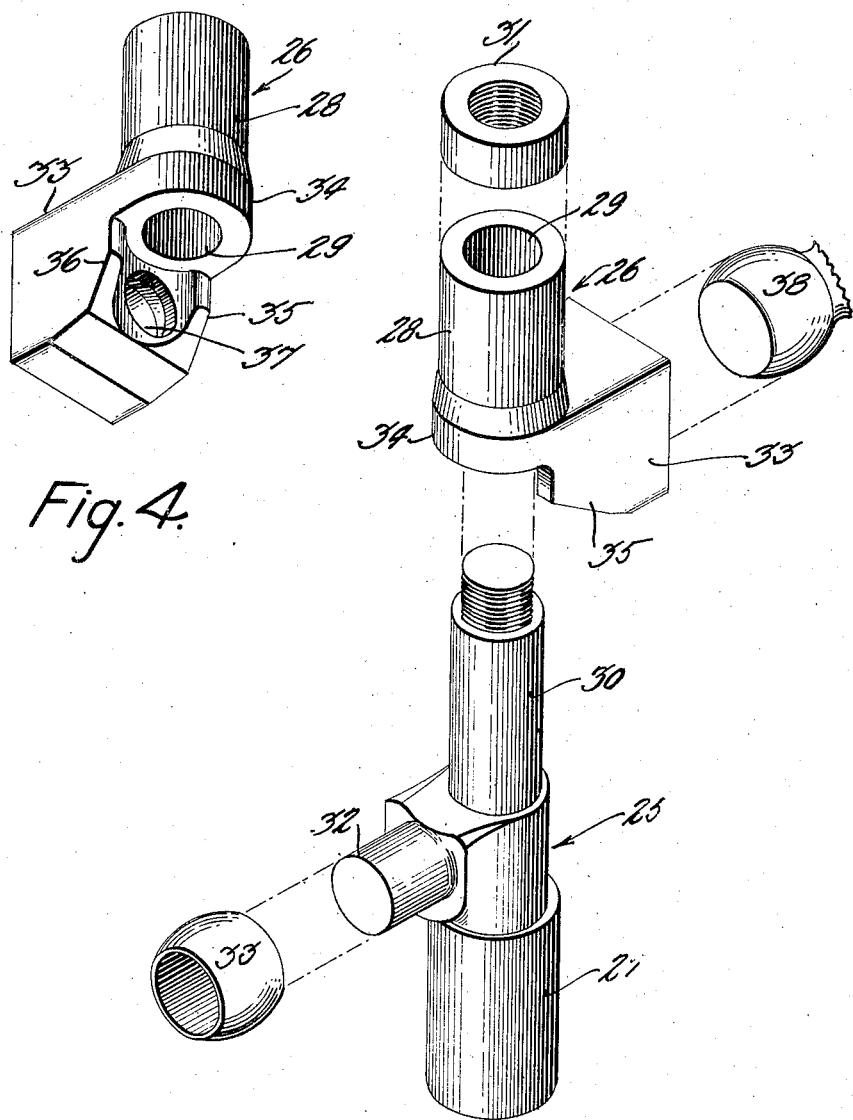
Figure 3 is a perspective detail of the controller disassembled.
Figure 4 is a perspective view of one element of the controller.

With reference to the drawings, 10 designates a drive shaft operatively connected to the driven shaft 11 by a form of universal joint requiring a control member such as constitutes the subject matter of this invention.

The shafts 10 and 11 are illustrated in the drawings as not supported in bearings for the purpose of featuring the possibility of angular deflection therebetween. It is obvious however, that either or both of said shafts may be mounted in fixed bearings, or supported in a manner as to permit of the angular movement of one shaft relative the other as would be the case for example if the shaft 11 were replaced by a member mounted for driving a steerable vehicle wheel.

The drive shaft 10 is bifurcated as at 12 and is provided with cross pins 13. Upon the cross pins 13 there is mounted for oscillation an inner intermediate ring member 14 provided with bores 16 in which the cross pins are disposed. This member 14 is further provided with a pair of hollow trunnions 17, (Fig. 1) disposed transaxially of the bores 16, and engaging for oscillation an outer intermediate ring member 18.

The driven shaft 11 is provided with a U-shaped yoke 19 conveniently formed integral with the shaft in the present showing, said yoke 19 being provided with cross pins 21 which engage in the bores 22 of the outer ring 18 in an oscillatory manner. From this construction it will be seen that the rings 14, 18 are pivoted together for relative rotary movement about the axis of the trunnions 17 which are spaced circumferentially 90° from the trunnions which connect the rings with their respective shafts. It will be noted that the outer and the inner ring members 14 and 18 form a conventional gimbal ring structure adapted to transmit torque from one shaft to the other and it is in this or an equivalent structure that my improved control means can be incorporated.

In compound joints of the type illustrated, it is necessary in order to realize constant velocity ratio, to control the attitude of the intermediate ring members 14, 18. The swing of the inner member 14 on the drive shaft cross pins 13, must always be one-half of the angular deflection of the drive shaft 10 (in the same plane) relative to the driven shaft 11. As shown in the drawings there is provided in the present instance a relatively rugged control member of such improved structure as to secure maximum strength and rigidity without having relatively increased the overall dimensions thereof.

Accordingly there is slidably mounted in the hollow trunnions 17 of the inner intermediate member 14 a two-part hinged cruciform joint controlling member comprising the elements 25 and 26 each of which are provided with a journal portion 27 and 28 respectively, said journal portions being adapted to fit within the hollow trunnions 17 of the inner ring 14 for sliding and oscillation. The journal 28 is bored at 29 to receive the pintle portion 30 which is in integral part of the element 25, and a threaded nut 31 is provided to secure the two elements 25 and 26 in an oscillatory relationship.

Each of the two elements mentioned are provided with an integral right-angularly disposed limb portion designated by 32 and 33 of which the limb 32 is formed cylindrical so as to permit of a spherical member 33, which is jointed in the yoke 19, being slidably mounted thereon, whereas the limb portion 33 is formed of rectangular section, a part of which extends around the journal portion 28 at 34, thus materially reinforcing that portion of this element which is also further strengthened by the stiffening ribs 35, 36. The limb portion 33 is bored as at 37 to receive for sliding and oscillation, a spherical member 38 which is part of the shaft 10.

It will be seen that a rugged control member constructed of few parts has been made possible by the present disclosure and that there is thus provided a joint control member adapted to operate at extreme angles where a large component of the driving load reacts upon the control member.

Variations may be resorted to within the scope of the invention and portions of the improvement may be used without the others.

Having thus described my invention, I claim:—

1. In a joint adapted for connecting a driving and a driven member and provided with spaced apart axially aligned bearings, a control means for the joint comprising a two-part member each part having a journal slidably engaged in only one of said bearings for relative oscillation of its parts, a portion extending laterally from each of said parts and rigid therewith; said portions respectively engaging the driving and the driven member in a rotationally free manner, and an integral pintle portion formed upon one of said parts on which the other of said parts is mounted for oscillation.

2. The combination with a universal joint having a driving and a driven shaft and a pair of intermediate members, of a non-driving connection between the shafts and the intermediate members adapted to maintain one of said members in a plane bisecting the angle between the axes of the shafts and comprising, a pair of axially aligned elements, one of said elements extending through the other and adapted for relative oscillation whilst restrained against axial separation therefrom; said elements being respectively articulated to the driving and the driven shafts for sliding and oscillation.

3. In a universal joint having a driving and a driven member and an intermediate drive transmitting connection including a member provided with spaced apart hollow trunnions, a control means for the joint comprising, two elements each having a cylindrical journal disposed in axial alignment each journal being slidably engaged in only one of the hollow trunnions, and laterally extending arms one for each element and rigid therewith; said arms respectively articulated to the driving and driven members for sliding and oscillation.

4. The combination with a universal joint having a driving and a driven member and an intermediate drive transmitting connection provided with spaced apart bearings, of a control means comprising a pair of elements hinged upon each other and each provided with a cylindrical journal individually supported in one of said spaced apart bearings, a laterally extending limb portion for each element formed integral therewith; said limb portions articulated to the driving and driven members respectively.

5. In a control means for a universal joint having a driving and driven member and an intermediate drive transmitting connection, the combination of a first element having a cylindrical journal, said element also having an axial extension of reduced diameter, and a laterally extending limb portion formed integral therewith, a second element having a cylindrical journal bored to receive the axial extension of the first said element, and a laterally extending limb portion formed integral therewith; each of said journals being supported for relative oscillation and mutual sliding in said drive transmitting connection; said laterally extending limb portions being articulated to the driving and driven members respectively.

6. In apparatus of the class described, the combination of a driving and a driven member, a drive transmitting connection therebetween, a first element having a cylindrical journal, said element also having an axial extension of reduced diameter, and a laterally extending limb portion formed integral therewith, a second element having a cylindrical journal bored to receive the axial extension of the first said element, and a laterally extending limb portion of rectangular section formed integral therewith; said limb portion extending circumferentially around the journal, and strengthening ribs connecting with said limb portion and said journal; both of said limb portions being articulated to said driving and driven members respectively and the journals being slidably supported in the drive transmitting connection.

7. The combination with a universal joint having a driving and driven member and a drive transmitting connection therebetween having spaced apart bearings, of a joint control means comprising a first element having a cylindrical journal, a cylindrical portion of reduced diameter forming a pintle and extending axially from said journal, and a laterally extending limb portion provided with means for articulation to the driven member; said journal being engaged in one of said spaced-apart bearings, a second element having a cylindrical journal bored to receive said pintle, a laterally extending limb portion of rectangular section provided with means for articulation to the driving member, the last said journal being engaged in the other of said spaced apart bearings, and means to prevent axial separation of the journals aforesaid.

Signed at Keyport in the county of Monmouth and State of New Jersey this 24th day of September, A. D. 1926.

FRANK A. HAYES.